(12) United States Patent
Kawatani

(10) Patent No.: US 11,595,304 B2
(45) Date of Patent: Feb. 28, 2023

(54) COMMUNICATION DEVICE, COMMUNICATION CONTROL SYSTEM, COMMUNICATION CONTROL METHOD, AND COMMUNICATION CONTROL PROGRAM

(71) Applicant: NIPPON TELEGRAPH AND TELEPHONE CORPORATION, Tokyo (JP)

(72) Inventor: Muneyuki Kawatani, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 196 days.

(21) Appl. No.: 17/042,015

(22) PCT Filed: Mar. 26, 2019

(86) PCT No.: PCT/JP2019/012818
§ 371 (c)(1),
(2) Date: Sep. 25, 2020

(87) PCT Pub. No.: WO2019/189156
PCT Pub. Date: Oct. 3, 2019

(65) Prior Publication Data
US 2021/0044523 A1 Feb. 11, 2021

(30) Foreign Application Priority Data
Mar. 28, 2018 (JP) .............................. JP2018-062554

(51) Int. Cl.
*H04L 45/00* (2022.01)
*H04L 45/745* (2022.01)

(52) U.S. Cl.
CPC ............ *H04L 45/66* (2013.01); *H04L 45/745* (2013.01)

(58) Field of Classification Search
CPC .............................. H04L 45/66; H04L 45/745
See application file for complete search history.

(56) References Cited

U.S. PATENT DOCUMENTS

| 2011/0283016 A1* | 11/2011 | Uchida | H04L 47/125 709/235 |
| 2015/0172186 A1* | 6/2015 | Kizu | H04L 45/34 370/392 |

(Continued)

OTHER PUBLICATIONS

Eisenbud, Daniel, et al., "MAGLEV, A Fast and Reliable Software Network Load Balancer," Research at Google, 13th USENIX Symposium on Networked Systems Design and Implementation (NSDI 16), USENIX Association, Santa Clara, CA (2016), pp. 523-535.

*Primary Examiner* — Donald L Mills

(57) ABSTRACT

The present disclosure relates scaling out servers that performs Layer 3 (L3) termination. In particular, the server includes: a packet receiving unit which receives a packet from any load balancer performing L3 termination via an Layer 2 (L2) switch; an assignment unit which, by referencing a MAC/MARK number correspondence table in a storage unit, assigns to the received packet a MARK number that corresponds to a transmission source MAC address; a recording unit which records a MARK number for connection of the received packet in a connection/MARK number correspondence table; and a packet transmission unit which, when a reply packet to the received packet is to be transmitted, routes the reply packet via the L2 switch by acquiring, from a MARK number/GW correspondence table in the storage unit, an IP address of a load balancer corresponding to the MARK number associated with the connection of the received packet.

20 Claims, 14 Drawing Sheets

(56) References Cited

U.S. PATENT DOCUMENTS

2016/0248727 A1* 8/2016 Ikeda .................... H04L 61/103
2018/0343228 A1* 11/2018 Wei ..................... H04L 61/5007

* cited by examiner

| # | Src MAC address | MARK NO. |
|---|---|---|
| 1 | MC-LB-1 | 1 |
| 2 | MC-LB-2 | 2 |
| 3 | MC-LB-3 | 3 |
| ... | ... | ... |

Fig. 5

| # | CONNECTION ||||| MARK |
|---|---|---|---|---|---|---|
|   | src IP | dst IP | src port | dst port | protocol no. | |
| 1 | x.x.x.x | y.y.y.y | 56789 | 80 | 6 | 1 |
| 2 | | | | | | |
| 3 | | | | | | |
| ... | ... | ... | ... | ... | ... | ... |

| # | MARK NO. | gateway |
|---|---|---|
| 1 | 1 | IP-LB-1 |
| 2 | 2 | IP-LB-2 |
| 3 | 3 | IP-LB-2 |
| ... | ... | ... |

T533

(a)
SCALE UP (b)
DNS ROUND ROBIN

Fig. 13

| # | Src MAC address | MARK NO. | gateway |
|---|---|---|---|
| 1 | MC-LB-1 | 1 | IP-LB-1 |
| 2 | MC-LB-2 | 2 | IP-LB-2 |
| 3 | MC-LB-3 | 3 | IP-LB-2 |
| ... | ... | ... | ... |
| 3 | MC-LB-10 | 10 | IP-LB-10 |

T531'

ND COMMUNICATION CONTROL
PROGRAM

CROSS-REFERENCE TO RELATED
APPLICATIONS

This application is a U.S. 371 Application of International Patent Application No. PCT/JP2019/012818, filed on 26 Mar. 2019, which application claims priority to and the benefit of JP Application No. 2018-062554, filed on 28 Mar. 2018, the disclosures of which are hereby incorporated herein by reference in their entireties.

TECHNICAL FIELD

The present invention relates to a communication device, a communication control system, a communication control method, and a communication control program.

BACKGROUND ART

For measures to handle a situation where a communication device that performs L3 (layer 3) termination, such as a load balancer or firewall for example, has exceeded the limit of its capabilities, there is a method of adding (scaling out) the communication device. For example, in a case of scaling out load balancers here, there is a method of using DNS (Domain Name System) round robin in order to perform load distribution among the load balancers. In a case of using DNS round robin, a different VIP (Virtual Internet Protocol) is set to each load balancer in the same domain. A server group is also assigned to each load balancer, for the load balancers to perform load distribution processing.

When a load balancer to serve as a transfer destination of a packet is decided by DNS round robin, for example, the load balancer that has received the packet transfers the packet to one of the servers that has been assigned to the load balancer itself.

Now, a load balancer is a stateful device that performs NAT (Network Address Translation) of VIPs into IP addresses of physical servers, terminating DH (Diffie-Hellman) key exchange format (SSL Secure Sockets Layer)/TLS (Transport Layer Security), and executing L7 (layer 7) load balancing, for example. Accordingly, both packets to the server (upstream packets) and response packets from the server (downstream packets) need to be routed through the same load balancer. In a case of using DNS round robin here, upstream packets and downstream packets can be routed through the same load balancer by assigning a server group to each load balancer, as described above.

CITATION LIST

Non Patent Literature

[NPL 1] Maglev: A Fast and Reliable Software Network Load Balancer, [online], [searched on Mar. 16, 2018], Internet <URL: https://research.google.com/pubs/pub44824.html>

SUMMARY OF THE INVENTION

Technical Problem

However, in a case of using the above DNS round robin to scale out load balancers, new assigning of server groups to added load balancers and re-accommodation of the server group assigned to each load balancer becomes necessary, and accordingly there is a problem that setup is troublesome and costly.

The present invention has been made in light of the above, and it is an object thereof to provide a communication device, a communication control system, a communication control method, and a communication control program, where trouble and costs in setting work for scaling out communication devices that perform L3 termination can be reduced.

Means for Solving the Problem

In order to solve the above-described problem and achieve the object, a communication device according to the present invention is a second communication device that performs transmission/reception of a packet via any of a first communication device connected by an L2 switch and performing L3 termination. The communication device includes a packet reception unit that receives, from any of the first communication device via the L2 switch, a packet where a MAC (Media Access Control) address of the first communication device that is a transmission source of the packet is set in a transmission source MAC address thereof, a storage unit that stores a first correlation table in which the MAC address of the first communication device and an identification No. given to a connection of the packet are correlated, a second correlation table in which is recorded the identification No. for the connection of the packet received by the packet reception unit, and a third correlation table where an IP address of the first communication device and the identification No. are correlated, a giving unit that references the first correlation table and gives, to the connection of the packet received by the packet reception unit, the identification No. corresponding to the transmission source MAC address of the packet that has been received, a recording unit that records, in the second correlation table, the identification No. that the giving unit has given the connection of the packet that has been received, and a packet transmission unit that, in a case of transmitting a reply packet as to the packet that has been received, acquires the identification No. corresponding to the connection of the packet that has been received from the second correlation table, acquires the IP address of the first communication device corresponding to the identification No. that has been acquired from the third correlation table, and routes the packet to the IP address of the first communication device that has been acquired, via the L2 switch.

Effects of the Invention

According to the present invention, trouble and costs in setup for scaling out communication devices that perform L3 termination can be reduced.

BRIEF DESCRIPTION OF DRAWINGS

FIG. 4 is a diagram illustrating an example of a data configuration of a MAC/MARK No. correlation table.

FIG. 5 is a diagram illustrating an example of a data configuration of a connection/MARK No. correlation table.

FIG. 6 is a diagram illustrating an example of a data configuration of a MARK No./gateway (gateway: GW) correlation table.

FIG. 13 is a diagram illustrating an example of data configuration of a correlation table stored in a storage unit illustrated in FIG. 3.

DESCRIPTION OF EMBODIMENTS

An embodiment of the present invention will be described in detail below with reference to the Figures. Note that this embodiment does not limit the present invention. Parts that are the same are denoted by the same symbols in the Figures.

Embodiment

Figure 1:
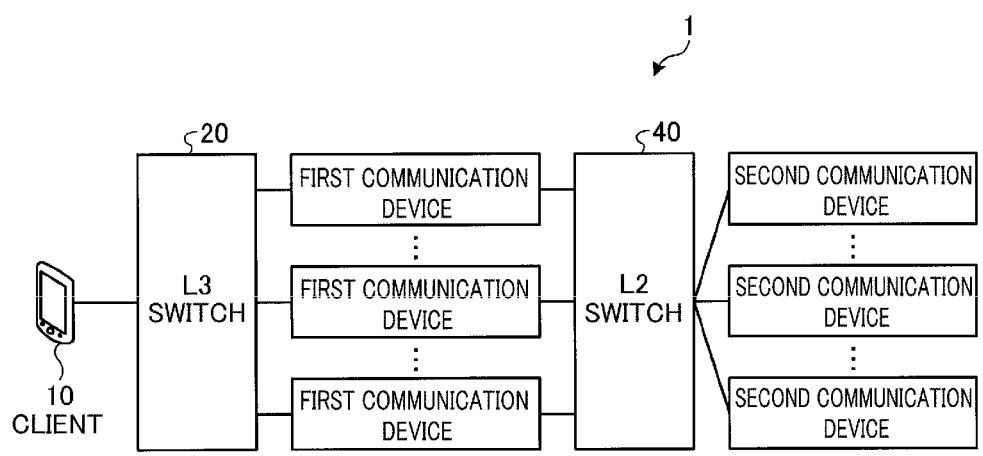
FIG. 1 is a diagram illustrating an example of a configuration of a communication control system according to an embodiment.

The embodiment of the present invention will be described. First, a basic configuration example of a communication control system according to the present embodiment will be described with reference to FIG. 1. FIG. 1 is a diagram illustrating an example of the configuration of the communication control system according to the embodiment.

The communication control system 1 according to the present embodiment has a communication device that is the object of scaling out (first communication device), and a communication device that performs transmission/reception of packets via this first communication device (second communication device), for example, as illustrated in FIG. 1. This first communication device is connected to a client 10 via an L3 (layer 3) switch 20, for example. The first communication device is also connected to the second communication device via an L2 (layer 2) switch 40, for example.

[Overview of Communication Control System]

Figure 2:
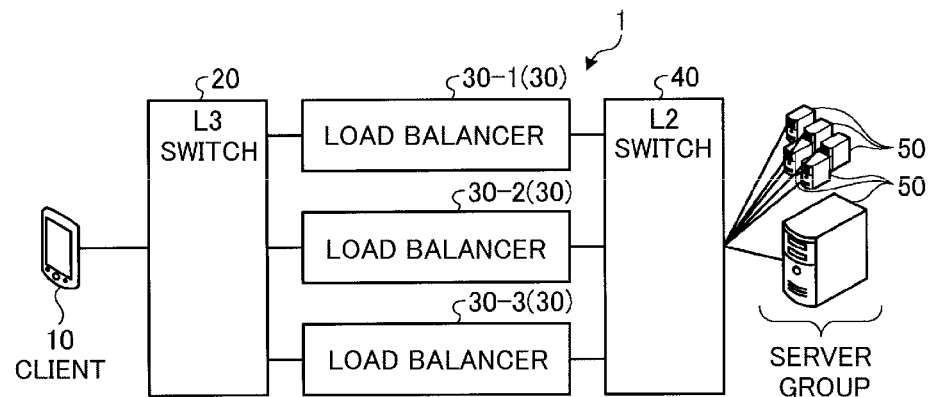
FIG. 2 is a diagram illustrating a specific configuration example of the communication control system according to the embodiment.

Next, a specific configuration of the communication control system 1 will be described with reference to FIG. 2. FIG. 2 is a diagram illustrating a specific configuration example of the communication control system according to the embodiment.

Now, a case will be described below where the first communication device that is the object of scaling out is a load balancer 30, as illustrated in FIG. 2. A case will be described where the second communication device is a server 50 that performs transmission/reception of packets via the load balancer 30. Note however, that the first communication device and second communication device are not limited to the load balancer 30 and server 50, as long as being communication devices that perform L3 termination. For example, the first communication device and second communication device may be a Carrier Grade NAT or VPN (Virtual Private Network) device, a Web Application Firewall, or the like.

The communication control system 1 has, for example, the client 10, the L3 switch 20, one or more load balancers 30, the L2 switch 40, and one or more servers 50 (a server group), as illustrated in FIG. 2. A case where three load balancers 30 (load balancers 30-1, 30-2, 30-3) are installed between the L3 switch 20 and L2 switch 40 will be described here as an example. Note that in the following description, packets from the client 10 to the server 50 will be referred to as upstream packets, and packets from the server 50 to the client 10 will be referred to as downstream packets.

The client 10 is a device that performs communication with the server 50. The L3 switch 20 performs routing of reception packets. For example, the L3 switch 20 transfers packets received from the client 10 to one of the load balancers 30 connected to itself. The L3 switch 20 decides the load balancer 30 to be the transfer destination of the reception packet from the client 10 by per-flow ECMP (Equal Cost Multi Path), for example.

The load balancers 30 perform load distribution processing of packets to the server group. The same VIP is set to each of the load balancers 30, for example, and the load balancers 30 operate in L3 mode. Also, the load balancers 30 are stateful devices that can perform NAT of the VIP set to the load balancer 30 itself into the IP address of the server 50, and execute L7 (layer 7) load balancing, for example. Note that the same VIP is set to each of the load balancers 30. The load balancers 30 are also each connected to the server group via the L2 switch 40.

Thus, the same VIP is set to each load balancer 30 including load balancers 30 added when scaling out, and the L3 switch 20 decides the load balancer 30 out of the load balancers 30 that is the transfer destination of an upstream packet by per-flow ECMP, for example. Accordingly, the load of upstream packets is distributed among the load balancers 30 as much as possible while transmitting upstream packets of the same TCP (Transmission Control Protocol) connection to the same load balancer 30.

MAC addresses and IP addresses that differ from each other are also set to the load balancers 30. An example of a case where a floating IP (FIP) is assigned to each load balancer 30, for example, will be described in the present embodiment. Also, the MAC addresses of the load balancers 30 are set in accordance with a MAC address giving rule that has been set beforehand. When a load balancer 30 is added, a MAC address is automatically given to this load balancer 30 following the MAC address giving rule.

The load balancers 30 have a communication unit that, when transferring an upstream packet to the server 50 via the L2 switch 40, sets its own MAC address in the transmission source MAC address of this upstream packet, and transfers the upstream packet. Also, in a case of having received a downstream packet from the server 50 via the L2 switch 40, the load balancer 30 transmits this downstream packet to the destination client 10 or the like via the L3 switch 20.

The L2 switch 40 connects the load balancers 30 and the server group. The L2 switch 40 transfers upstream packets from the load balancers 30 to the server 50, and transfers downstream packets from the server 50 to the load balancer 30 corresponding to the destination MAC addresses.

The server 50 performs various types of processing on the basis of the reception packet from the client 10, and thereafter transmits a reply packet to this reception packet to the client 10, for example. When transmitting the reply packet, the server 50 routes the reply packet through the load balancer 30 through which this reception packet was routed.

Now, the MAC address of a load balancer 30 (e.g., the load balancer 30-1) is set to the Src MAC address (transmission source MAC address) of the L2 header of the reception packet (arriving packet) at the server 50, and the MAC address of the server 50 is set to the Dst MAC address (destination MAC address).

The server 50 has set beforehand and stores an identification No. (MARK No.) to be given to a packet connection, correlated with the MAC address of each load balancer 30. The server 50 also stores beforehand an IP address for the load balancer, correlated with the MARK No.

When receiving a packet, the server 50 gives, to the connection of the packet that has been received, a MARK No. corresponding to the transmission source MAC address of the packet that has been received, on the basis of this stored information. In a case of transmitting a reply packet to the packet that has been received, the server 50 acquires the IP address of the load balancer 30 corresponding to the MARK No. given to the connection of the packet that has been received, and routes the reply packet to the IP address of the load balancer 30 that has been acquired, via the L2 switch.

Accordingly, the server 50 transmits downstream packets (reply packets) corresponding to upstream packets to the same load balancer 30 as the upstream packets. As a result, even in a case where load balancers 30 have been scaled out in the system, upstream packets from the client 10 to the server 50 and downstream packets from the server 50 to the client 10 can be routed through the same load balancer 30.

Accordingly, at the server 50, the user specifies a MAC addresses of a load balancer 30, and further the transmission source MAC address and routing of a returning packet are set beforehand, thereby enabling load balancers to be scaled out without performing any work at the server 50. Accordingly, at the time of scaling out the load balancers 30, load distribution of upstream packets, and routing downstream packets via the same load balancer 30 as upstream packets can be realized in the communication control system 1.

[Server Configuration]

Figure 3:
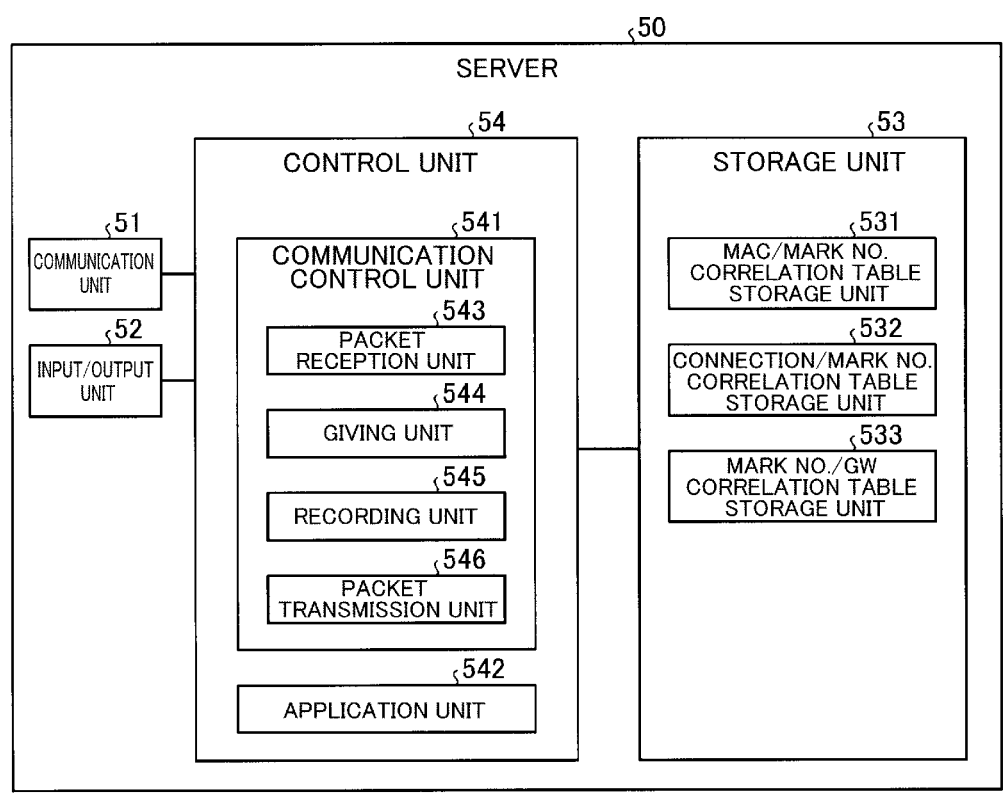
FIG. 3 is a diagram illustrating an example of a configuration of a server illustrated in FIG. 2.

Next, the configuration of the server 50 will be described with reference to FIG. 3. FIG. 3 is a diagram illustrating an example of the configuration of the server 50 illustrated in FIG. 2. The server 50 has a communication unit 51, an input/output unit 52, a storage unit 53, and a control unit 54, as illustrated in FIG. 3.

The communication unit 51 is a communication interface that transmits and receives various types of information to and from other devices. The communication unit 51 is realized by a NIC (Network Interface Card) or the like for example, and performs communication between other devise and the control unit 54 (described later) via an electric communication line such as a LAN (Local Area Network), the Internet, or the like. The communication unit 51 receives upstream packets via the L2 switch 40, and transmits downstream packets output from the control unit 54 via the L2 switch 40, for example.

The input/output unit 52 governs input and output of various types of information to and from the server 50. The input/output unit 52 accepts input of settings information or the like to the server 50, for example.

The storage unit 53 is realized by, for example, a semiconductor memory element such as RAM (Random Access Memory), flash memory (Flash Memory), or the like, or a storage device such as a hard disk, optical disc, or the like, and stores processing programs to operate the server 50, data used when running the processing programs, and so forth. The storage unit 53 has a MAC/MARK No. correlation table storage unit 531, connection/MARK No. correlation table storage unit 532, and a MARK No./GW correlation table storage unit 533.

The MAC/MARK No. correlation table storage unit 531 stores a MAC/MARK No. correlation table (first correlation table). FIG. 4 is a diagram illustrating an example of data configuration of a MAC/MARK No. correlation table. The Src MAC address (transmission source MAC address) and MARK No. (identification No.) of packets are correlated in the MAC/MARK No. correlation table T531, as illustrated in FIG. 4. The MAC/MARK No. correlation table T531 is set beforehand by the user and stored in the MAC/MARK No. correlation table storage unit 531. In other words, the MAC/MARK No. correlation table is a settings table that has been passively set in the server 50.

The transmission source MAC addresses shown in the MAC/MARK No. correlation table T531 are MAC addresses of the load balancers 30 that are transmission sources of packets. A MAC address is assigned to each load balancer 30, and are set in accordance with a MAC address giving rule set beforehand. For example, Src MAC address "MC-LB-1" is set to load balancer 30-1, Src MAC address "MC-LB-2" is set to load balancer 30-2, and Src MAC address "MC-LB-3" is set to load balancer 30-3.

Also, the MARK Nos. shown in the MAC/MARK No. correlation table T531 are identification Nos. given to connections of packets. These MARK Nos. are Nos. set to each load balancer 30, and may be any sort of Nos. as long as there is no duplication among the load balancers 30. In the example of the MAC/MARK No. correlation table T531, MARK No. "1" is set to the Src MACMAC address "MC-LB-1" of the load balancer 30-1.

Note that correlation between MAC addresses and MARK Nos. is not limited to the number of load balancers 30 currently installed, to enable increasing the number of load balancer 30 to be handled. In other words, it is sufficient to have a desired number of MAC addresses set that the user desires, with non-duplicating MARK Nos. correlated with the respective MAC addresses.

The connection/MARK No. correlation table storage unit 532 stores a connection/MARK No. correlation table (second correlation table). FIG. 5 is a diagram illustrating an example of a data configuration of a connection/MARK No. correlation table.

The connection/MARK No. correlation table T532 is a table where MARK Nos. are recorded as to connections of packets received by a packet reception unit 543 (described layer), as illustrated in FIG. 5.

Keys (src IP, dst IP, src port, dst port, protocol.no) for identifying connections of packets are recorded in the connection spaces of the connection/MARK No. correlation table T532 by the packet reception unit 543 (described later) when receiving packets. MARK Nos. corresponding to connections of packets identified by the keys are recorded in the MARK No. spaces of the connection/MARK No. correlation table T532 by a recording unit 545 (described later). In other words, the connection/MARK No. correlation table is data for the server 50 to dynamically add and delete data while performing packet processing.

The MARK No./GW correlation table storage unit 533 stores a MARK No./GW correlation table (third correlation table). FIG. 6 is a diagram illustrating an example of a data configuration of a MARK No./GW correlation table. IP addresses of routing destinations (GW) and MARK Nos. are correlated in the MARK No./GW correlation table T533, as illustrated in FIG. 6. The MARK No./GW correlation table T533 is set beforehand and stored in the MARK No./GW correlation table storage unit 533. In other words, the MARK No./GW correlation table is a settings table that has been passively set in the server 50.

FIPs of GWs that are the destinations of packets corresponding to the MARK Nos. are set in the gateway spaces of the MARK No./GW correlation table T533. For example, in the example of the MARK No./GW correlation table T533, the FIP "IP-LB-1" of the load balancer 30-1 is set to the MARK No. "1" for the Src MAC address "MC-LB-1" of the load balancer 30-1.

Thus, the MAC addresses and IP addresses of the load balancers 30 are stored correlated through MARK Nos. in the server 50. In other words, the server 50 stores the MAC addresses of load balancers 30 that are the transmission sources of reception packets, and IP addresses of the load balancers 30 which should be given at the time of transmitting reply packets as to these packets, correlated through MARK Nos.

Next, the control unit 54 will be described. The control unit 54 controls the overall server 50. The control unit 54 has internal memory for storing programs defining various types of processing procedures and so forth, and necessary data, and executes various types of processing thereby. The control unit 54 is an electronic circuit such as a CPU (Central Processing Unit) or MPU (Micro Processing Unit) or the like, for example. The control unit 54 also functions as various types of processing units by various types of programs operating. The control unit 54 has a communication control unit 541 and an application unit 542.

The communication control unit 541 performs reception of packets, recording connections of reception packets, giving and recording of MARK Nos, destination settings of transmission packets, and transmission of packets. The communication control unit 541 has the packet reception unit 543, a giving unit 544, a recording unit 545, and a packet transmission unit 546.

The packet reception unit 543 receives packets addressed to the server 50 (upstream packets) via the communication unit 51. Note that the MAC address of the load balancer 30 that has transferred the upstream packet is set in the transmission source MAC address of this upstream packet. The packet reception unit 543 also records keys (src IP, dst IP, src port, dst port, protocol.no) of the received packet in the connection spaces in the connection/MARK No. correlation table stored in the connection/MARK No. correlation table storage unit 532.

The giving unit 544 references the MAC/MARK No. correlation table stored in the MAC/MARK No. correlation table storage unit 531, and gives, to the connection of the packet that has been received, the MARK No. corresponding to the transmission source MAC address of the packet that the packet reception unit 543 has received.

The recording unit 545 records, in the connection/MARK No. correlation table that the connection/MARK No. correlation table storage unit 532 stores, the MARK No. that the giving unit 544 has given the connection of the packet that has been received. The recording unit 545 records, in a MARK space corresponding to the connection keys of the packet that has been received out of the MARK No. spaces in the connection/MARK No. correlation table, the MARK No. that the giving unit 544 has given.

The packet transmission unit 546 transmits downstream packets (reply packets) as to upstream packets, via the communication unit 51. In a case of transmitting a reply packet as to a packet that has been received, the packet transmission unit 546 acquires, from the connection/MARK No. correlation table, the MARK No. corresponding to the connection of the packet that has been received. The packet transmission unit 546 then acquires the IP address of the load balancer 30 corresponding to the MARK No. that has been acquired, from the MARK No./GW correlation table stored in the MARK No./GW correlation table storage unit 533. The packet transmission unit 546 subsequently routes the packet to the IP address of the load balancer 30 that has been acquired, via the L2 switch.

Note that the above association of connections of upstream packets and MARK Nos. and setting of destination IP addresses to downstream packets is performed using an API that the Linux (a registered trademark) Kernel has, called netfilter, for example. Specifically, an OS (Operating System) function called CONNMARK in iptables is used for giving MARK Nos. to connections of upstream packets and destination IP addresses to downstream packets. The server 50 sets beforehand correlation between MAC addresses and MRAK Nos. using iptables commands.

The application unit 542 subjects reception packets to various types of processing. For example, the application unit 542 performs various types of processing on upstream packets received by the packet reception unit 543, and outputs the results of processing thereof to the packet transmission unit 546.

[Flow of Processing]

Figure 7:
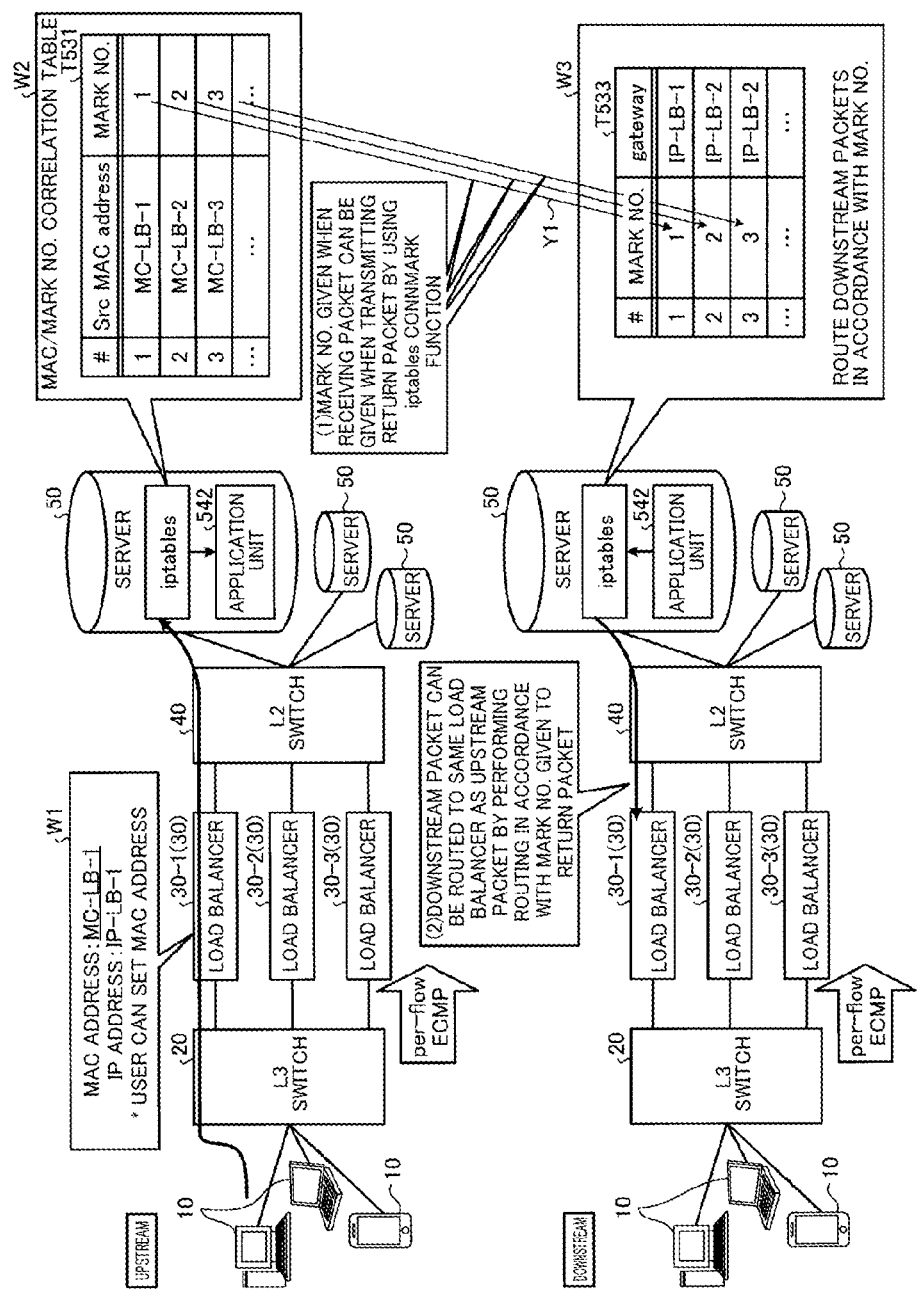
FIG. 7 is a diagram for describing a flow of packet processing in the communication control system illustrated in FIG. 2.

Next, the flow of packet processing in the communication control system 1 will be described with reference to FIG. 7. FIG. 7 is a diagram for describing the flow of packet processing in the communication control system 1 illustrated in FIG. 2. N clients 10 are installed in the communication control system. Also, the MAC address of the load balancer 30-1 is "MC-LB-1" and the IP address is "IP-LB-1". The user can set the MAC addresses of the load balancers 30-1 through 30-3. Three server 50 are also installed. The servers 50 are each connected to the load balancers 30-1 through 30-2 via the L2 switch 40.

A case will be considered where the L3 switch 20 receives an upstream packet from a client 10 in such a communication control system. In this case, the L3 switch 20 first decides the load balancer 30 to be the transfer destination of this packet by per-flow ECMP. Thus, processing load of upstream packets can be distributed among the load balancers 30.

For example, in a case where the L3 switch 20 has decided the transfer destination of the upstream packet to be the load balancer 30-1, the L3 switch 20 transfers this upstream packet to the load balancer 30-1. Thereafter, the load balancer 30-1 sets its own MAC address "MC-LB-1" in the Src MAC address (transmission source MAC address) in the L2 header of the packet that has been transferred (see frame W1), and transmits the packet to the L2 switch 40.

Upon receiving this packet (upstream packet) via the L2 switch 40, the server 50 reads out the Src MAC address (transmission source MAC address) from the L2 header of this upstream packet. This transmission source MAC address is the MAC address of the load balancer 30 that transferred the upstream packet. The server 50 then references the MAC/MARK No. correlation table T531 (see frame W2), and gives the MARK No. corresponding to the MAC address that has been read out to the connection of the packet that has been received. For example, the server 50 references the MAC/MARK No. correlation table T531 (see frame W2) regarding the upstream packet of which the Src MAC address is MAC address "MC-LB-1", and gives the MARK No. "1"

Next, a case of the server 50 transmitting a downstream packet as to the above upstream packet, in response to a request from the application unit 542, will be described. In this case, the server 50 routes the downstream packet in accordance with the MARK No. thereof (see frame W3). Specifically, the server 50 acquires (see arrow Y1) the IP address "IP-LB-1" of the load balancer 30-1 corresponding to the MARK No. "1" given to the connection of the packet that has been received, from the MARK No correlation table T533 (see frame W3), and routes the packet to the IP address of the load balancer 30 that has been acquired, via the L2 switch.

At this time, the server 50 is capable of giving the MARK No., given at the time of packet reception, when transmitting the return packet, by using the iptables CONNMARK function (See (1) in FIG. 7). The server 50 is also capable of routing the downstream packet to the same load balancer 30-1 as the upstream packet by performing routing in accordance with the MARK No. given to the return packet (see (2) in FIG. 7).

Accordingly, the downstream packet transmitted from the server 50 reaches the load balancer 30-1 that the upstream packet has been routed through, and reaches the client 10 that is the destination of the downstream packet from the load balancer 30-1.

Thus, the communication control system 1 can distribute the load of upstream packets among the load balancers 30, and can route downstream packets through the same load balancers 30 as the upstream packets. As a result, the communication control system 1 can realize scaling out of the load balancers 30.

Also, MAC addresses of the load balancers 30 are automatically set in accordance with the MAC address giving rule. No work needs to be done at the server 50 when scaling out the load balancers 30 as long as the user passively specifies the correspondence relation between MAC addresses, MARK Nos., and routing destinations (Gateway) to the server 50 beforehand. Thus, according to the communication control system 1, trouble and costs of setting work for scaling out the load balancers 30 can be reduced.

Specific Example of Flow of Processing

Figure 8:
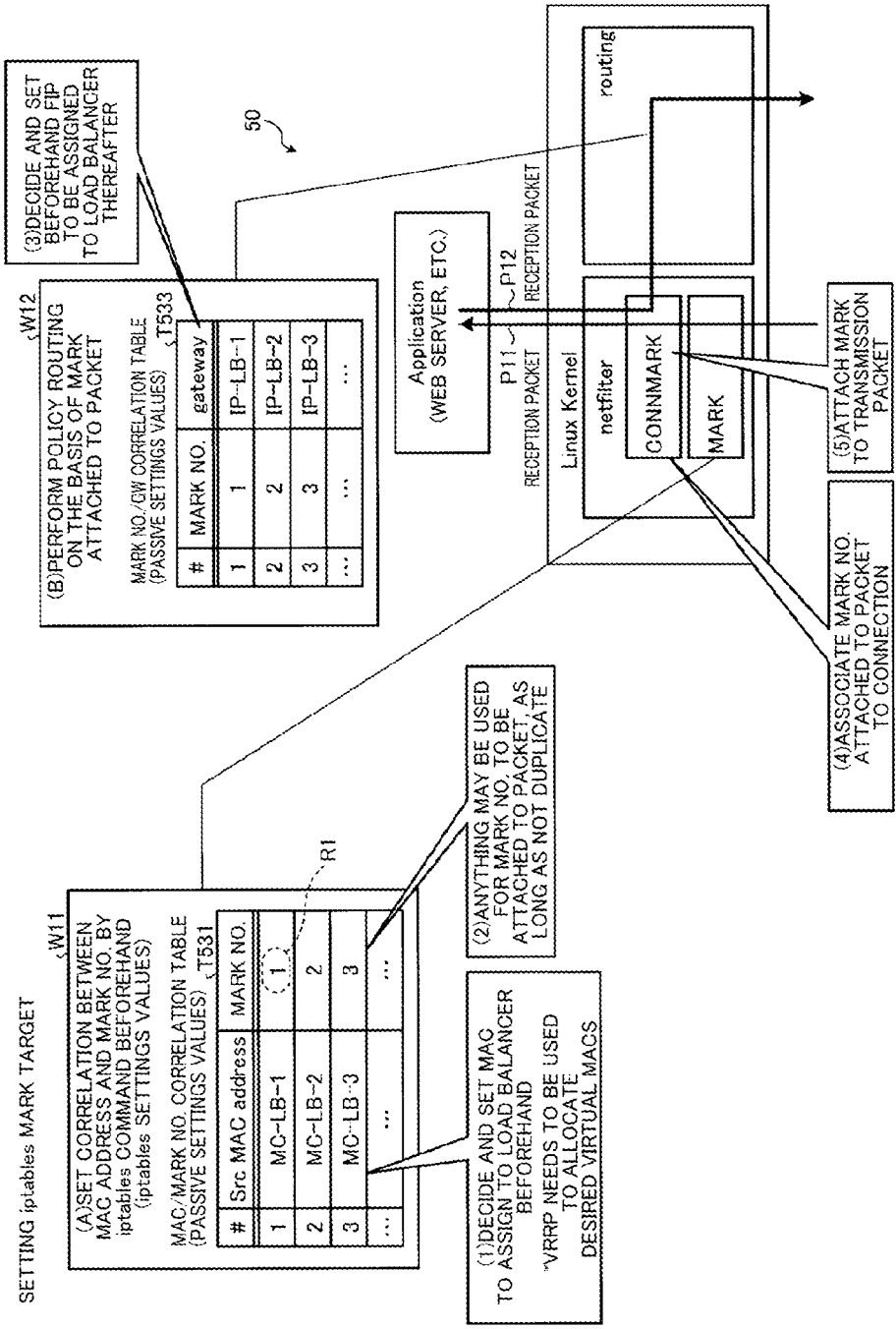
FIG. 8 is a diagram for describing a flow of packet transmission/reception processing at the server illustrated in FIG. 3.
Figure 9:
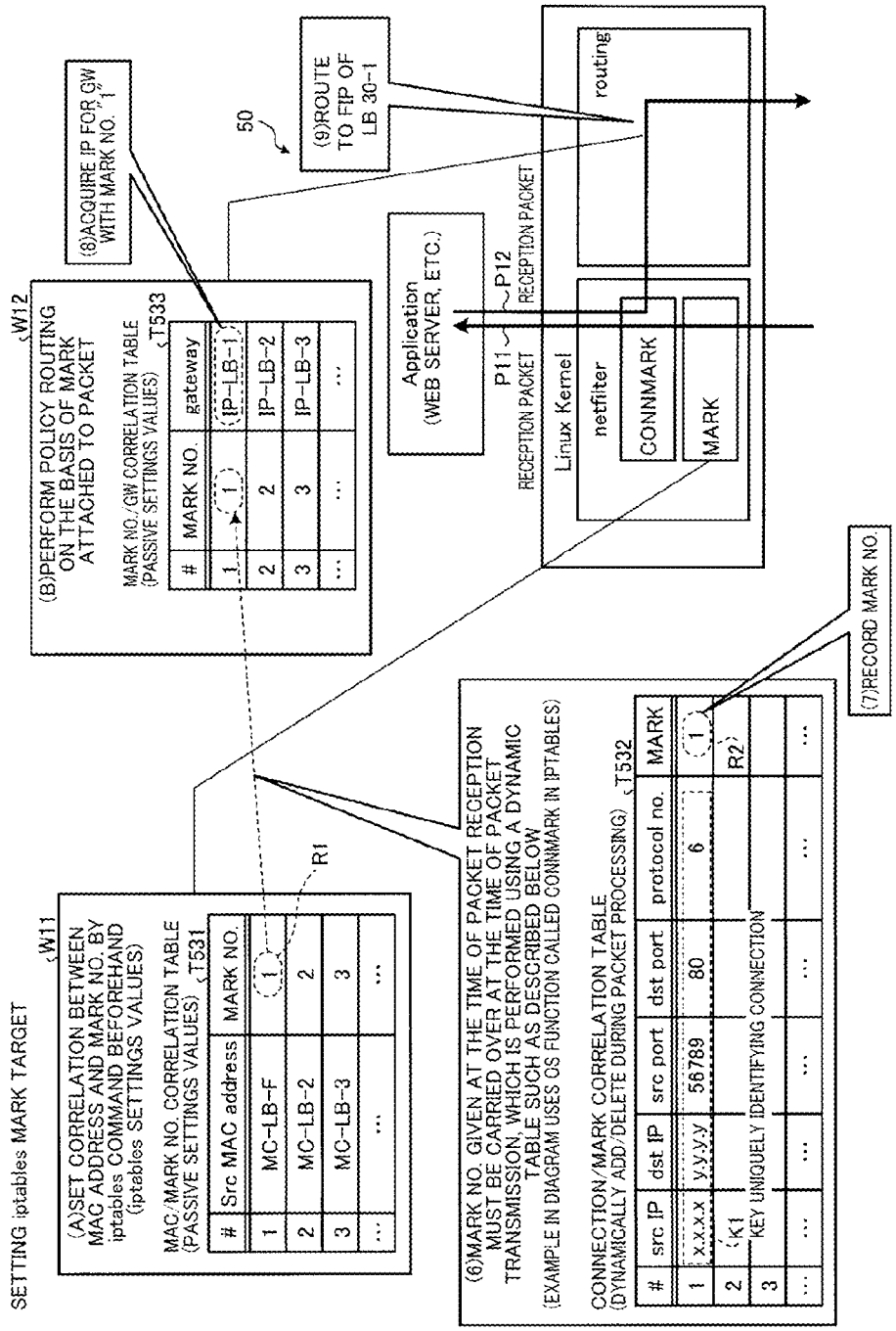
FIG. 9 is a diagram for describing a flow of packet transmission/reception processing at the server illustrated in FIG. 3.

The flow of transmission/reception processing of packets at the server 50 will be described next with reference to FIG. 8 and FIG. 9. FIG. 8 and FIG. 9 are diagrams for describing the flow of packet transmission/reception processing at the server 50 illustrated in FIG. 3.

First, the user sets beforehand the correlation between MAC addresses and MARK Nos. by iptables command (settings values in iptables), as illustrated in FIG. 8 (see (A) in frame W11 in FIG. 8). Specifically, the user sets a MAC/MARK No. correlation table T531 (passive settings values), where the MAC addresses of load balancers 30 and MARK Nos. which are identification Nos. have been correlated (see frame W11 in FIG. 8), in the server 50.

Here, the user decides and sets MAC addresses to be assigned to the load balancer beforehand. In this case, there is a need for the user to use VRRP (Virtual Router Redundancy Protocol) to allocate desired virtual MAC addresses (see (1) in FIG. 8). Note that anything may be used as MARK Nos. to be attached to packets, as long as there is no duplication among the load balancers 30 (see (2) in FIG. 8).

The user also sets beforehand the MARK No./GW correlation table T533 (passive settings values) where MARK Nos. and IP addresses of GWs have been correlated (see (B) in frame W12 in FIG. 8). In this case, the user decides and sets beforehand FIPs to be assigned to load balancers thereafter (see (3) in FIG. 8).

In a case of the server 50 actually receiving a packet, the netfilter (MARK function) references the MAC/MARK No. correlation table T531 and acquires a MARK No. corresponding to the transmission source MAC address of a reception packet P11 at the server 50. Next, at the server 50, the netfilter (CONNMARK function) associates the MARK No. given to the reception packet P11 with the connection of this reception packet (see (4) in FIG. 8).

Next, upon a transmission packet P12 corresponding to the results of processing as to the reception packet being output from application, the netfilter (CONNMARK function) gives the transmission packet a MARK No. (see (5) in FIG. 8).

Now, the server 50 must carry over the MARK No. given at the time of packet reception to the time of packet transmission, which is performed using a dynamic table (connection/MARK No. correlation table T532) such as described below (see (6) in FIG. 9). In the example in the Figure, the server 50 uses a function called CONNMARK in iptables.

Specifically, the server 50 uses the CONNMARK function to acquire MARK No. "1" (see region R1 in frame W11) corresponding to the transmission source MAC address "MC-LB-1" of the reception packet P11, and records the acquired "1" (see R2 in FIG. 9) in the MARK space for key K1 that uniquely identifies connections, in the connection/MARK No. correlation table T532 (see (7) in FIG. 9).

The server 50 performs Policy Routing on the basis of the MARK No. given to the reception packet (see (B) in frame W12 in FIG. 9). At this time, the server 50 acquires the FIP address "IP-LB-1" of the GW with MRAK No. "1" (see (8) in FIG. 9), and routes the transmission packet to this IP address "IP-LB-1" via the L2 switch (see (9) in FIG. 9).

[Processing Procedures of Packet Reception Processing]

Figure 10:
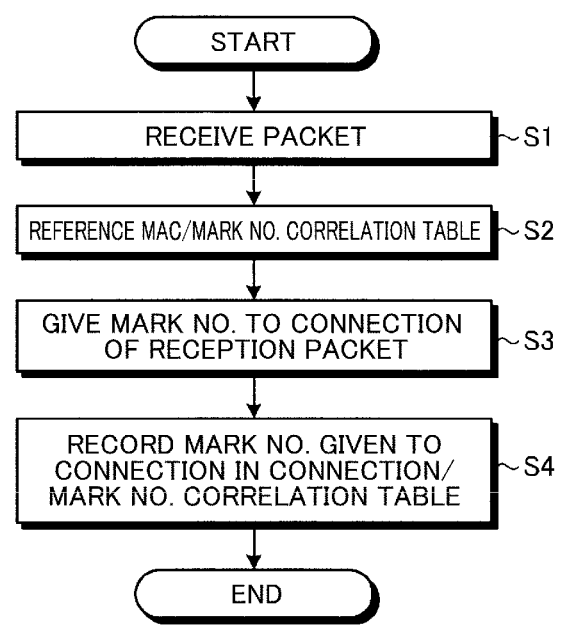
FIG. 10 is a flowchart illustrating processing procedures for packet reception processing at the server illustrated in FIG. 3.

Next, the processing procedures of packet reception processing at the server 50 will be described. FIG. 10 is a flowchart illustrating the processing procedures of packet reception processing at the server 50 illustrated in FIG. 3.

Upon the packet reception unit 543 receiving a packet (step S1), the giving unit 544 references the MAC/MARK No. correlation table (step S2), and gives, to the connection of this reception packet, a MARK No. corresponding to the transmission source MAC address of the reception packet by the packet reception unit 543 (step S3), as illustrated in FIG. 10. Next, the recording unit 545 records, in the connection/MARK No. correlation table, the MARK No. given to the connection of the packet that has been received (step S4).

[Processing Procedures of Packet Transmission Processing]

Figure 11:
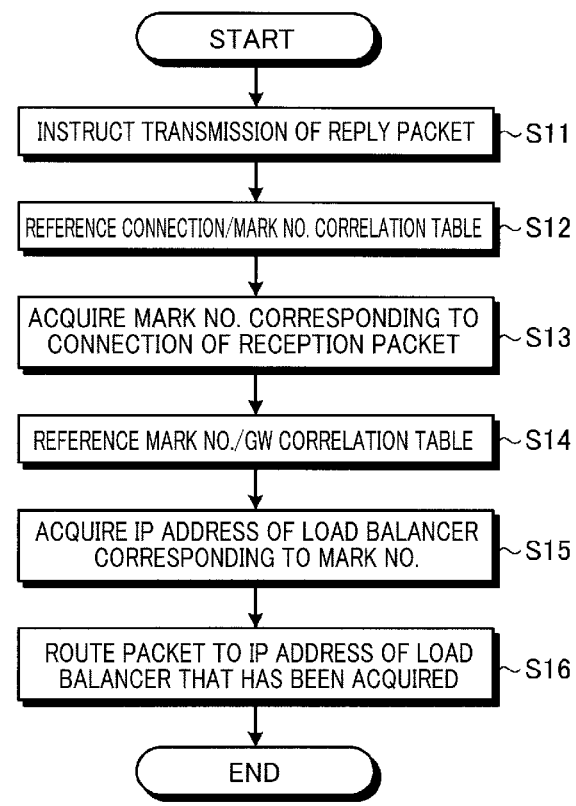
FIG. 11 is a flowchart illustrating processing procedures for packet transmission processing at the server illustrated in FIG. 3.

Next, the processing procedures of packet transmission processing at the server 50 will be described. FIG. 11 is a flowchart illustrating the processing procedures of packet transmission processing at the server 50 illustrated in FIG. 3.

Upon receiving an instruction to transmit a reply packet as to a packet that has been received (step S11), the packet transmission unit 546 references the connection/MARK No.

correlation table (step S12) and acquires a MARK No. corresponding to the connection of the packet that has been received, from the connection/MARK No. correlation table (step S13), as illustrated in FIG. 11.

The packet transmission unit 546 references the MARK No./GW correlation table (step S14), and acquires the IP address of the load balancer 30 corresponding to the MARK No. that has been acquired (step S15). The packet transmission unit 546 routes the packet to the IP address of the load balancer 30 that has been acquired, via the L2 switch (step S16).

Advantages of the Embodiment

Figure 12:
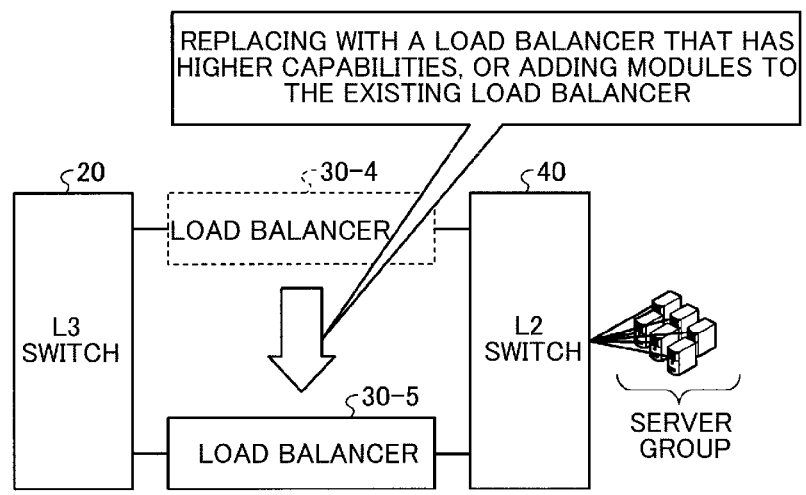
FIG. 12 is a diagram illustrating an example of scaling up load balancers and scaling out load balancers by DNS round robin.
Figure 12:
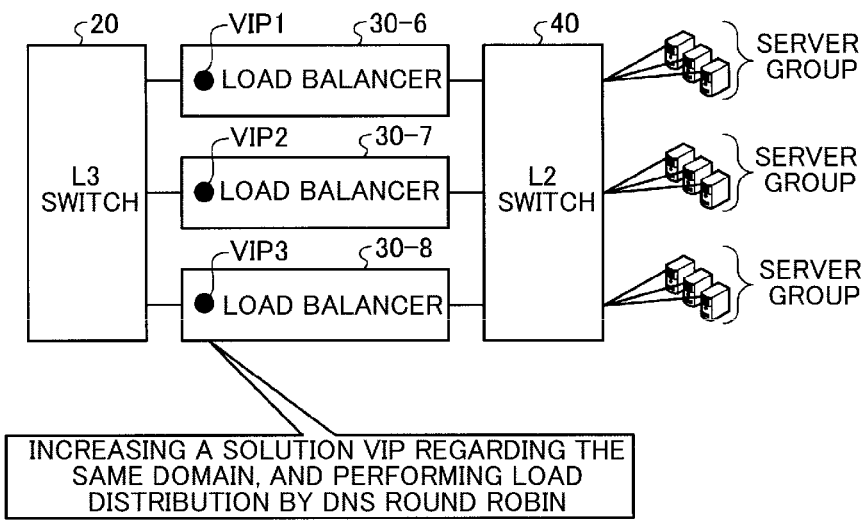

Next, advantages of the communication control system 1 according to the embodiment will be described, while making comparison with scaling up load balancers and scaling out load balancers by DNS round robin according to known technology. FIG. 12 is a diagram illustrating an example of scaling up load balancers and scaling out load balancers by DNS round robin.

Scaling up load balancers is performed by replacing an existing load balancer 30-4 with a load balancer 30-5 that has higher capabilities, or adding modules to the existing load balancer 30-4, for example, as illustrated in (a) in FIG. 12.

Also, scaling out load balancers by DNS round robin involves increasing a solution VIP regarding the same domain (e.g., VIP3), and performing load distribution by DNS round robin, as illustrated in (b) in FIG. 12. For example, in a case of adding a load balancer 30-8 to a load balancer 30-6 (VIP1) and a load balancer 30-7 (VIP2), VIP3 is set to this load balancer 30-8. Also, in a case of adding the load balancer 30-8, grouping is performed again among the load balancers 30-6, 30-7, and 30-8, regarding the server groups under each of the load balancers 30.

(1) About Scaling Work Time

In a case of scaling up the load balancer 30-4, GW change of all servers 50 under the load balancers is necessary. Also, in a case of scaling out load balancers 30 by DNS round robin, DNS-related work needs to be performed with all servers to be incorporated in the additional load balancer. In comparison with this, simply adding a load balancer 30 is sufficient in the present embodiment.

(2) About Setting Work and Setting Costs

In a case of scaling up the load balancer 30-4, changing GW settings of the server group is necessary, and in a case of scaling out the load balancers 30 by DNS round robin, setting of the server group to be assigned to the additional load balancer 30-8, and making changes in DNS server settings, are necessary. In comparison with this, MAC addresses of the load balancers 30 are automatically set in accordance with the MAC address giving rule in the present embodiment. All that the user needs to do is to set the MAC/MARK No. correlation table and MARK No./GW correlation table beforehand, and no work needs to be performed at the server 50 when scaling out the load balancers 30 in the present embodiment.

(3) About Server Division Loss

In the case of scaling up the load balancer 30-4 above, there is no so-called server division loss since re-dividing server groups does not occur, but in a case of scaling out the load balancers 30 by DNS round robin, there is the need to perform regrouping of server groups assigned to the 30-6, 30-7, and 30-8, and accordingly server division loss occurs. In comparison with this, no such service division loss occurs in the case of the present embodiment.

(4) About Failback

In the case of scaling up the load balancer 30-4 above, a long period of time is necessary to perform failback. Also, in a case of scaling out the load balancers 30 by DNS round robin, performing failback makes for troublesome work, since the work of deleting DNS server records and server restoration occurs. Reflecting the results of the work also takes time, since there is TTL (Time To Live) of the DNS server cache. Conversely, in the case of the system according to the present embodiment, all that is necessary to perform failback is to delete routing information of the L3 switch 20, so little work is necessary for failback.

(5) Server Overhead

In the case of scaling up the load balancer 30-4 and the case of scaling out the load balancers 30 by DNS round robin above, no server overhead occurs. In the present embodiment, read/write of tables is not performed for each packet, so no server overhead occurs.

(6) Necessity of Development

In the case of scaling up the load balancer 30-4 and the case of scaling out the load balancers 30 by DNS round robin above, there is no need to create programs. The present embodiment can be realized using only functions included in major Linux distributions, such as iptables (CONNMARK) and so forth, so there is no need to create new programs.

As described above, in the present embodiment, the user specifies MAC addresses of load balancers 30 to the server 50, and further sets transmission source MAC addresses and routing of return packets thereof beforehand. Accordingly, the user can perform scaling out (or failure/isolation) of load balancers without performing any work at the server 50 whatsoever, according to the present embodiment. As a result, according to the present embodiment, the trouble and cost of performing setting work for scaling out of the load balancers 30 can be reduced.

Also, the amount of processing load per packet can be reduced in the present embodiment by passively setting MAC address information. Also, there is no need to use a complicated mechanism like parallel operation of tables in the present embodiment. According to the present embodiment, no division loss of server groups under the load balancers 30 occurs, and further setting work and setting costs when performing failback can also be reduced.

Note that FIG. 13 is a diagram illustrating an example of data configuration of a correlation table that the storage unit 53 illustrated in FIG. 3 stores. Although description has been made in the present embodiment regarding a case where the server 50 stores each of the MAC/MARK No. correlation table and MARK No./GW correlation table as an example, this is not restrictive. The server 50 may store just a correlation table where MAC addresses of load balancers 30, MARK Nos., and GW IP Nos. are correlated as in a correlation table T531', as illustrated in FIG. 13, for example.

Other Embodiments

There is a configuration called client-firewall/load balancer-server as a typical network configuration between client and server. In this configuration, there are cases where the firewall is scaled out. Now, a firewall is also a stateful device, so the technology described regarding load balancers in the above embodiment may be applied to cases of scaling out a firewall in the above configuration. That is to say, the first communication devices in the system configuration diagram illustrated in FIG. 1 may be firewalls, and the second communication devices may be load balancers.

In this case, the load balancers which are the second communication devices store a MAC/MARK No. correlation table where MAC addresses of firewalls and MARK Nos. are correlated, and the MARK No./GW correlation table. The transmission source MAC address set in the L2 header of a packet received via a firewall (reception packet) enables the transmission source MAC address of this reception packet (e.g., the MAC address of the firewall through which the reception packet was routed) to be acquired.

The load balancer then acquires the MARK No. corresponding to the transmission source MAC address of this reception packet. At the time of transmitting a reply packet as to this reception packet to the firewall side, the load balancer acquires the IP address of the GW corresponding to the MARK No. of this reception packet, and routes the packet to this IP address via the L2 switch 40. Accordingly, the reply packet (downstream packet) arrives at the same firewall as the firewall through which this reception packet (upstream packet) has been routed. That is to say, even in a case where firewalls have been scaled out in the system, upstream packets and downstream packets can be routed through the same firewall.

[System Configuration, Etc.]

The components of the devices illustrated in the Figures are functionally conceptual, and are not necessarily physically configured as illustrated in the Figures. That is to say, specific forms of dispersion/integration of the devices are not limited to those illustrated in the Figures, and all or part may be configured functionally or physically dispersed/integrated in optional increments in accordance with various types of loads, usage conditions, and so forth. Further, all or an optional part of the processing functions carried out at each device may be realized by a CPU and a program executed for analysis by the CPU, or alternatively may be realized as hardware through wired logic.

Also, of the processes described in the present embodiment, all or part of processes described as being automatically performed can be manually performed. Alternatively, all or part of processes described as being manually performed can be automatically performed by known methods. Moreover, processing procedures, control procedures, specific names, and information including various types of data and parameters, shown in the above document and Figures, can be optionally changed unless specifically stated otherwise.

[Program]

Figure 14:
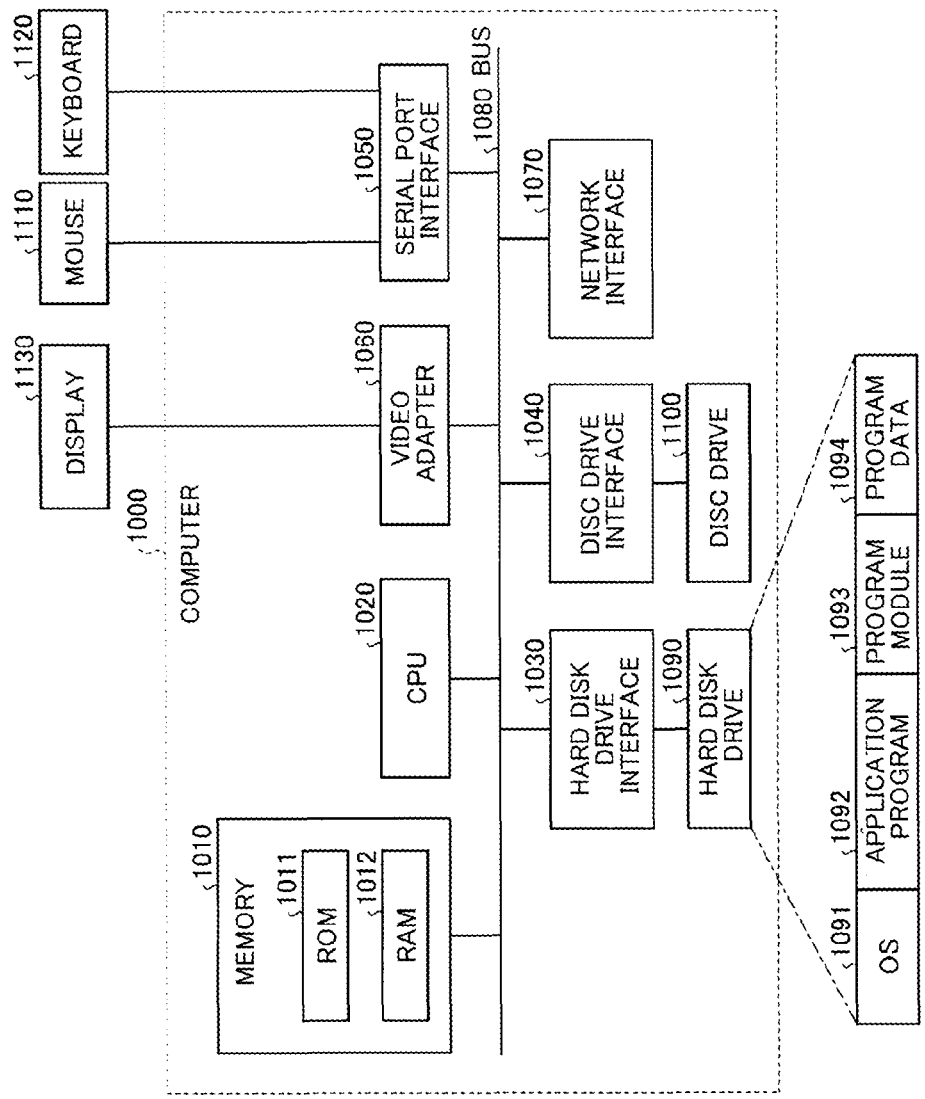
FIG. 14 is a diagram illustrating an example of a computer where a server is realized by a program being executed.

FIG. 14 is a diagram illustrating an example of a computer where the server 50 is realized by a program being executed. A computer 1000 has memory 1010 and a CPU 1020, for example. The computer 1000 also has a hard disk drive interface 1030, a disc drive interface 1040, a serial port interface 1050, a video adapter 1060, and a network interface 1070. These parts are connected by a bus 1080.

The memory 1010 includes ROM (Read Only Memory) 1011 and RAM 1012. The ROM 1011 stores a boot program such as a BIOS (Basic Input Output System), for example. The hard disk drive interface 1030 is connected to a hard disk drive 1090. The disc drive interface 1040 is connected to a disc drive 1100. A detachable storage medium such as a magnetic disk or optical disc or the like, for example, is inserted to the disc drive 1100. The serial port interface 1050 is connected to, for example, a mouse 1110 and keyboard 1120. The video adapter 1060 is connected to a display 1130, for example.

The hard disk drive 1090 stores, for example, an OS 1091, an application program 1092, a program module 1093, and program data 1094. That is to say, a program that defines each processing of the server 50 is implemented as a program module 1093 in which code that is executable by the computer is described. The program module 1093 is stored in the hard disk drive 1090, for example. A program module 1093 for executing processing the same as the functional configurations of the server 50, for example, is stored in the hard disk drive 1090. Note that an SSD (Solid State Drive) may substitute for the hard disk drive 1090.

Also, settings data used in processing in the above-described embodiment is stored in the memory 1010 or hard disk drive 1090, for example, as the program data 1094. The CPU 1020 reads the program module 1093 and program data 1094 stored in the memory 1010 or hard disk drive 1090 to the RAM 1012 as necessary, and performs execution thereof.

Note that the program module 1093 and program data 1094 is not limited to a case of being stored in the hard disk drive 1090, and may be stored in a detachable storage medium for example, and be read out by the CPU 1020 via the disc drive 1100 or the like. Alternatively, the program module 1093 and program data 1094 may be stored in another computer connected via a network (LAN, WAN (Wide Area Network), etc.). The program module 1093 and program data 1094 may be read out from the other computer by the CPU 1020 via the network interface 1070.

An embodiment to which an invention made by the present inventor has been applied has been described above, but the present invention is not limited by the description and Figures making up a part of the disclosure of the present invention by way of the present embodiment. That is to say, other embodiments, examples, operational technology, and so forth, made by one skilled in the art or the like on the basis of the present embodiment, are all encompassed by the scope of the present invention.

REFERENCE SIGNS LIST

1 Communication control system
10 Client
20 L3 switch
30, 30-1 through 30-8 Load balancer
40 L2 switch
50 Server
51 Communication unit
52 Input/output unit
53 Storage unit
54 Control unit
531 MAC/MARK No. correlation table storage unit
532 Connection/MARK No. correlation table storage unit
533 MARK No./GW correlation table storage unit
541 Communication control unit
542 Application unit
543 Packet reception unit
544 Giving unit
545 Recording unit
546 Packet transmission unit

The invention claimed is:

1. A computer-implemented method for controlling data communication, the method comprising:

receiving a data packet from a first communication device of a first set of first communication devices via a Layer 2 (L2) switch by a second communication device of a second set of second communication devices, wherein the data packet includes a transmission source Media Access Control (MAC) address of the first communication device, the second communication device includes a Layer 3 (L3) termination, and Internet Protocol (IP) addresses of the first set of the first communication devices and the second set of the second communication devices are distinct from each other;

storing a first correlation table in a storage, wherein the first correlation table includes the MAC address of the first communication device and an identification number corresponding to a connection associated with the received data packet;

storing a second correlation table in the storage, wherein the second correlation table includes the identification number of the connection associated with the received data packet and data associated with the connection, and the data associated with the connection includes an IP address of the first communication device;

storing a third correlation table in the storage, wherein the third correlation table includes the IP address of the first communication device and the identification number of the connection of the received packet;

generating a reply data packet in response to the received data packet, comprising:

retrieving, from the second correlation table, the identification number of the connection of the received data packet; and retrieving, from the third correlation table, the IP address of the first communication device corresponding to the received identification number of the connection of the received data packet; and transmitting, by routing via the L2 switch using the IP address of the first communication device, the reply data packet to the first communication device.

2. The computer-implemented method of claim 1, the method further comprising:

automatically assigning, based on a predefined rule for assigning the MAC address, the MAC address of the first communication device, wherein the predefine rule relates to at least the first correlation table.

3. The computer-implemented method of claim 1, wherein the first communication device is one of a plurality of communication devices for performing an L3 termination, wherein the plurality of communication devices connect the L2 switch and the L3 switch, and wherein the plurality of communication devices include one or more load balancers.

4. The computer-implemented method of claim 1, wherein the data associated with the connection in the second correlation table further includes:

a destination IP address of the received data packet,
a source port number of the received data packet,
a destination port number of the received data packet, and
a communication protocol identifier.

5. The computer-implemented method of claim 1, wherein the third correlation table includes an IP address of a gateway for a routing destination.

6. The computer-implemented method of claim 1, wherein the received data packet relates to an upstream communication, wherein the reply data packet relates to a downstream communication, and wherein the received data packet and the reply data packet pass through the first communication device.

7. The computer-implemented method of claim 1, wherein the L3 switch connects one or more client devices and the first communication device, wherein the L2 switch connects the first communication device and the second communication device, and wherein the second communication device is one of servers.

8. A system for controlling data communication, the system comprises:

a processor; and a memory storing computer-executable instructions that when executed by the processor cause the system to:

receive a data packet from a first communication device of a first set of first communication devices via a Layer 2 (L2) switch by a second communication device of a second set of second communication devices, wherein the data packet includes a transmission source Media Access Control (MAC) address of the first communication device, the second communication device includes a Layer 3 (L3) termination, and Internet Protocol (IP) addresses of the first set of the first communication devices and the second set of the second communication devices are distinct from each other;

store a first correlation table in a storage, wherein the first correlation table includes the transmission source MAC address of the first communication device and an identification number corresponding to a connection associated with the received data packet;

store a second correlation table in the storage, wherein the second correlation table includes the identification number of the connection associated with the received data packet, and the data associated with the connection including an IP address of the first communication device;

store a third correlation table in the storage, wherein the third correlation table includes the IP address of the first communication device and the identification number of the connection of the received packet;

generating a reply data packet in response to the received data packet, comprising:

retrieving, from the second correlation table, the identification number of the connection of the received data packet; and retrieving, from the third correlation table, the IP address of the first communication device corresponding to the received identification number of the connection of the received data packet; and transmit, by routing via the L2 switch using the IP address of the first communication device, the reply data packet to of the first communication device.

9. The system of claim 8, the computer-executable instructions when executed further causing the system to:

automatically assign, based on a predefined rule for assigning the MAC address, the MAC address of the first communication device, wherein the predefine rule relates to at least the first correlation table.

10. The system of claim 8, wherein the first communication device is one of a plurality of communication devices for performing an L3 termination, wherein the plurality of communication devices connect the L2 switch and the L3 switch, and wherein the plurality of communication devices include one or more load balancers.

11. The system of claim 8, wherein the data associated with the connection in the second correlation table further includes:

a destination IP address of the received data packet,
a source port number of the received data packet,
a destination port number of the received data packet, and
a communication protocol identifier.

12. The system of claim 8, wherein the third correlation table includes an IP address of a gateway for a routing destination.

13. The system of claim 8, wherein the received data packet relates to an upstream communication, wherein the reply data packet relates to a downstream communication, and wherein the received data packet and the reply data packet pass through the first communication device.

14. The system of claim 8, wherein the L3 switch connects one or more client devices and the first communication device, wherein the L2 switch connects the first communication device and the second communication device, and wherein the second communication device is one of servers.

15. A computer-readable non-transitory recording medium storing computer-executable instructions that when executed by a processor cause a computer system to:
   receive a data packet from a first communication device of a first set of first communication devices via a Layer 2 (L2) switch by a second communication device of a second set of second communication devices, wherein the data packet includes a transmission source Media Access Control (MAC) address of the first communication device, the second communication device includes a Layer 3 (L3) termination, and Internet Protocol (IP) addresses of the first set of the first communication devices and the second set of the second communication devices are distinct from each other;
   store a first correlation table in a storage, wherein the first correlation table includes the MAC address of the first communication device and an identification number corresponding to a connection associated with the received data packet;
   store a second correlation table in the storage, wherein the second correlation table includes the identification number of the connection associated with the received data packet and data associated with the connection, and the data associated with the connection includes an IP address of the first communication device;
   store a third correlation table in the storage, wherein the third correlation table includes the IP address of the first communication device and the identification number of the connection of the received packet;
   generate a reply data packet in response to the received data packet, comprising:
      retrieve, from the second correlation table, the identification number of the connection of the received data packet; and
      retrieve, from the third correlation table, the IP address of the first communication device corresponding to the received identification number of the connection of the received data packet; and
   transmit, by routing via the L2 switch using the IP address of the first communication device, the reply data packet to the first communication device.

16. The computer-readable non-transitory recording medium of claim 15, the computer-executable instructions when executed further causing the system to:
   automatically assign, based on a predefined rule for assigning the MAC address, the MAC address of the first communication device, wherein the predefine rule relates to at least the first correlation table.

17. The computer-readable non-transitory recording medium of claim 15, wherein the first communication device is one of a plurality of communication devices for performing an L3 termination, wherein the plurality of communication devices connect the L2 switch and the L3 switch, and wherein the plurality of communication devices include one or more load balancers.

18. The computer-readable non-transitory recording medium of claim 15, wherein the data associated with the connection in the second correlation table further includes:
   a destination IP address of the received data packet,
   a source port number of the received data packet,
   a destination port number of the received data packet, and
   a communication protocol identifier.

19. The computer-readable non-transitory recording medium of claim 15, wherein the received data packet relates to an upstream communication, wherein the reply data packet relates to a downstream communication, and wherein the received data packet and the reply data packet pass through the first communication device.

20. The computer-readable non-transitory recording medium of claim 15, wherein the L3 switch connects one or more client devices and the first communication device, wherein the L2 switch connects the first communication device and the second communication device, and wherein the second communication device is one of servers.

* * * * *